S. GERMAN.
CORN HUSKING MACHINE.
APPLICATION FILED FEB. 16, 1916.

1,194,615.

Patented Aug. 15, 1916.
5 SHEETS—SHEET 1.

S. GERMAN.
CORN HUSKING MACHINE.
APPLICATION FILED FEB. 16, 1916.

1,194,615.

Patented Aug. 15, 1916.
5 SHEETS—SHEET 2.

Fig. 2.

S. GERMAN.
CORN HUSKING MACHINE.
APPLICATION FILED FEB. 16, 1916.
1,194,615.
Patented Aug. 15, 1916.
5 SHEETS—SHEET 5.
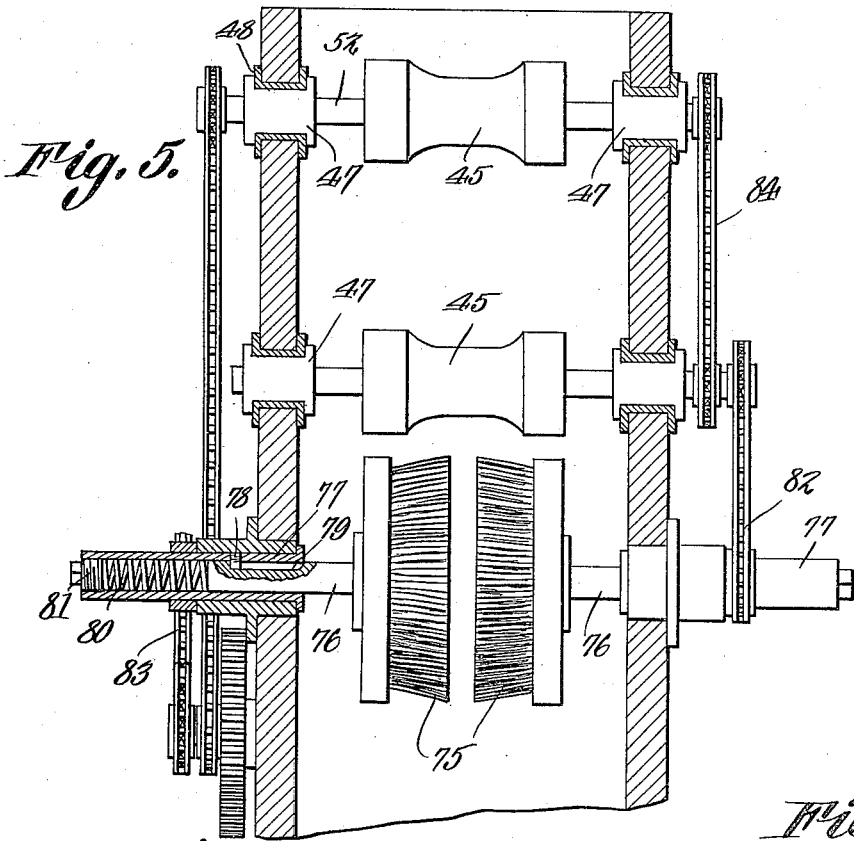
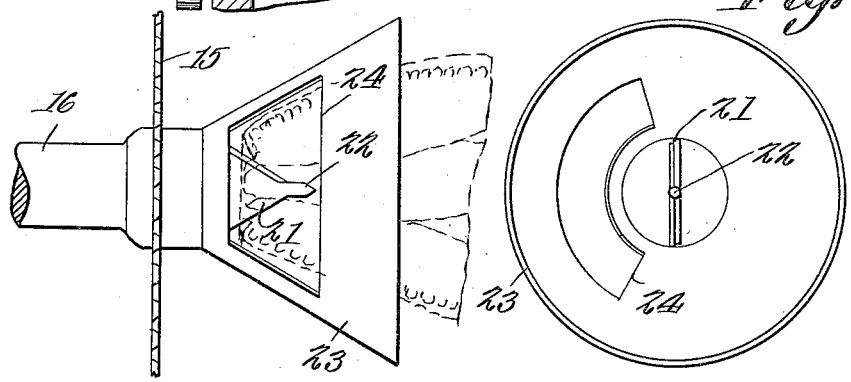
Inventor
Solomon German,
By Henry J. Brewington.
Attorney

UNITED STATES PATENT OFFICE.

SOLOMON GERMAN, OF JESSUPS, MARYLAND.

CORN-HUSKING MACHINE.

1,194,615.  Specification of Letters Patent.  Patented Aug. 15, 1916.

Application filed February 16, 1916. Serial No. 78,564.

*To all whom it may concern:*

Be it known that I, SOLOMON GERMAN, a citizen of the United States, residing at Jessups station, in the county of Howard and State of Maryland, have invented certain new and useful Improvements in Corn-Husking Machines, of which the following is a specification.

This invention relates to machines or apparatus for removing the husks from ears of corn, and its object is to provide a machine of this kind which is very efficient in operation, a novel and improved means being provided for stripping the husks off the ears.

The invention also has for its object to provide a novel and improved cutter for cutting the husks where they join the cob, to leave them simply wrapped on the ear and unconnected at the butt end of the cob, thereby facilitating the stripping operation.

With the objects stated in view, the invention consists in a novel combination and arrangement of parts to be hereinafter described and claimed, and in order that the same may be better understood, reference is had to the accompanying drawings, forming a part of this specification.

Figure 1:
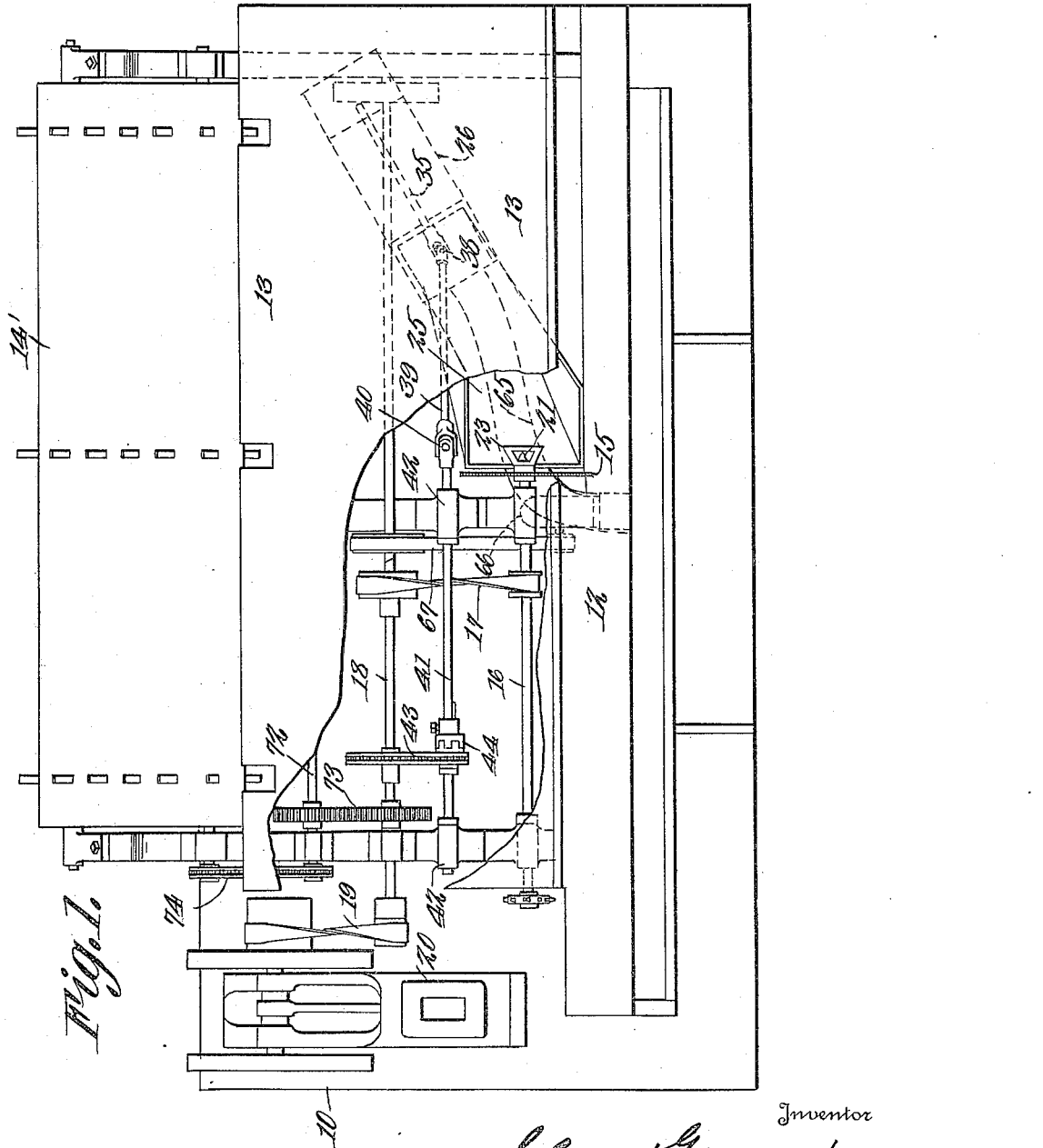
Figure 2:
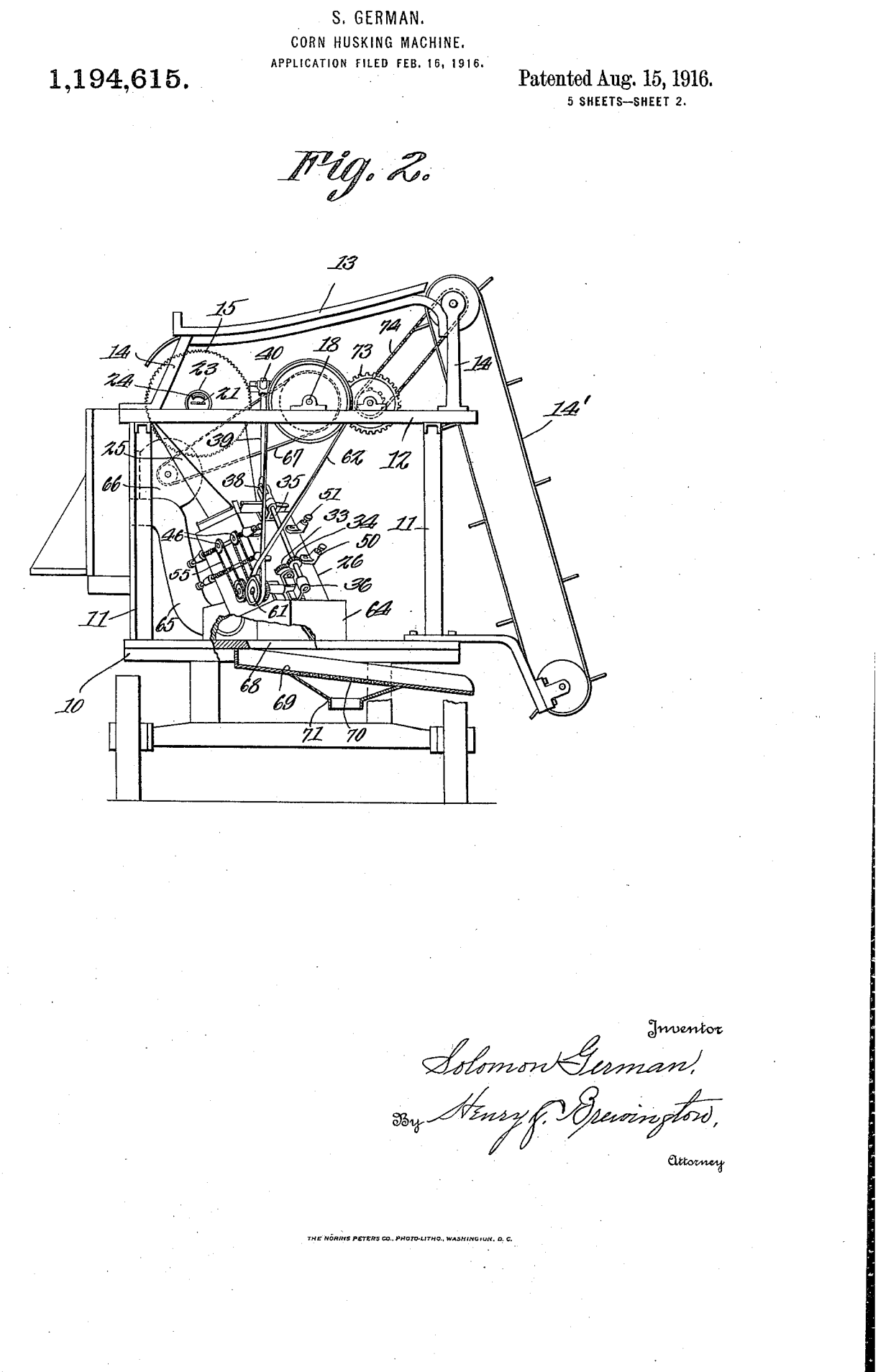
Figure 3:
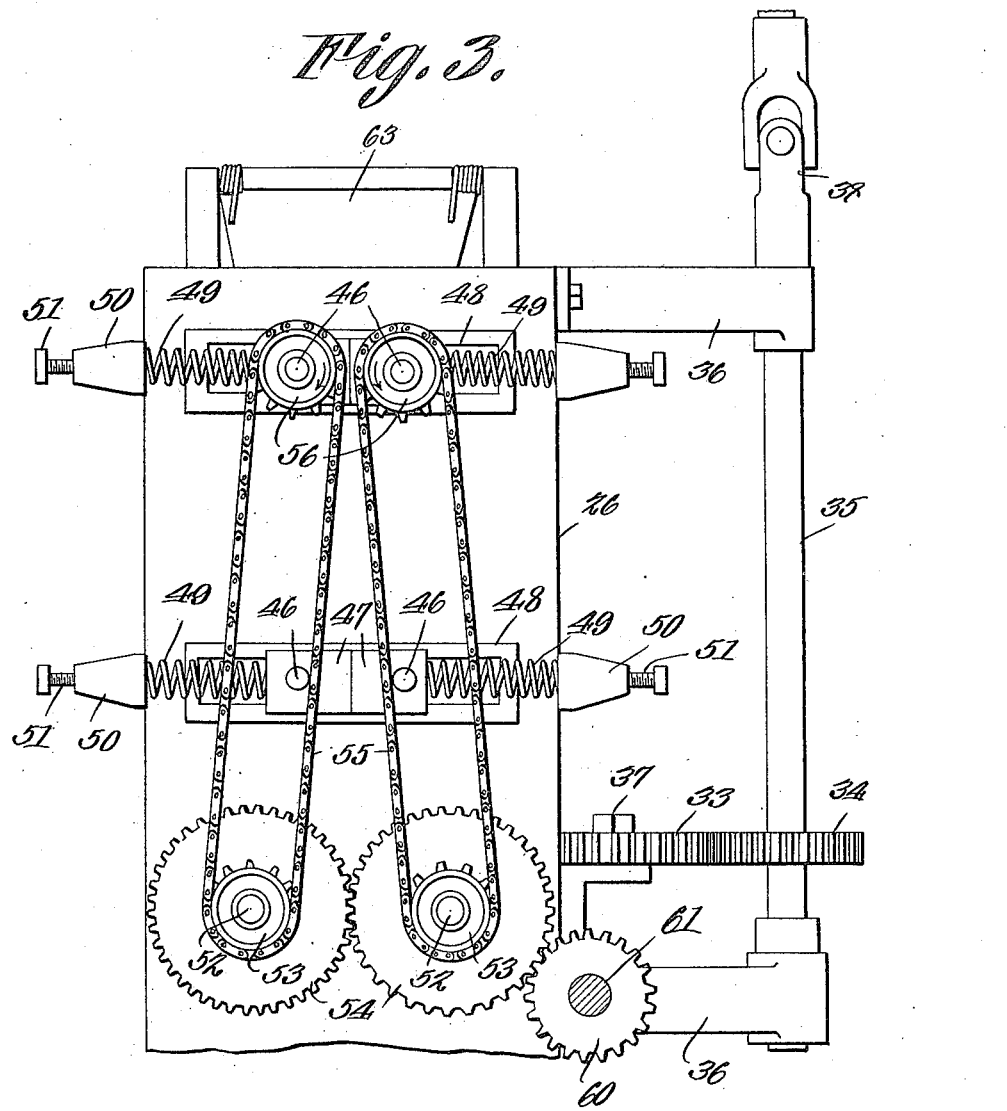
Figure 4:
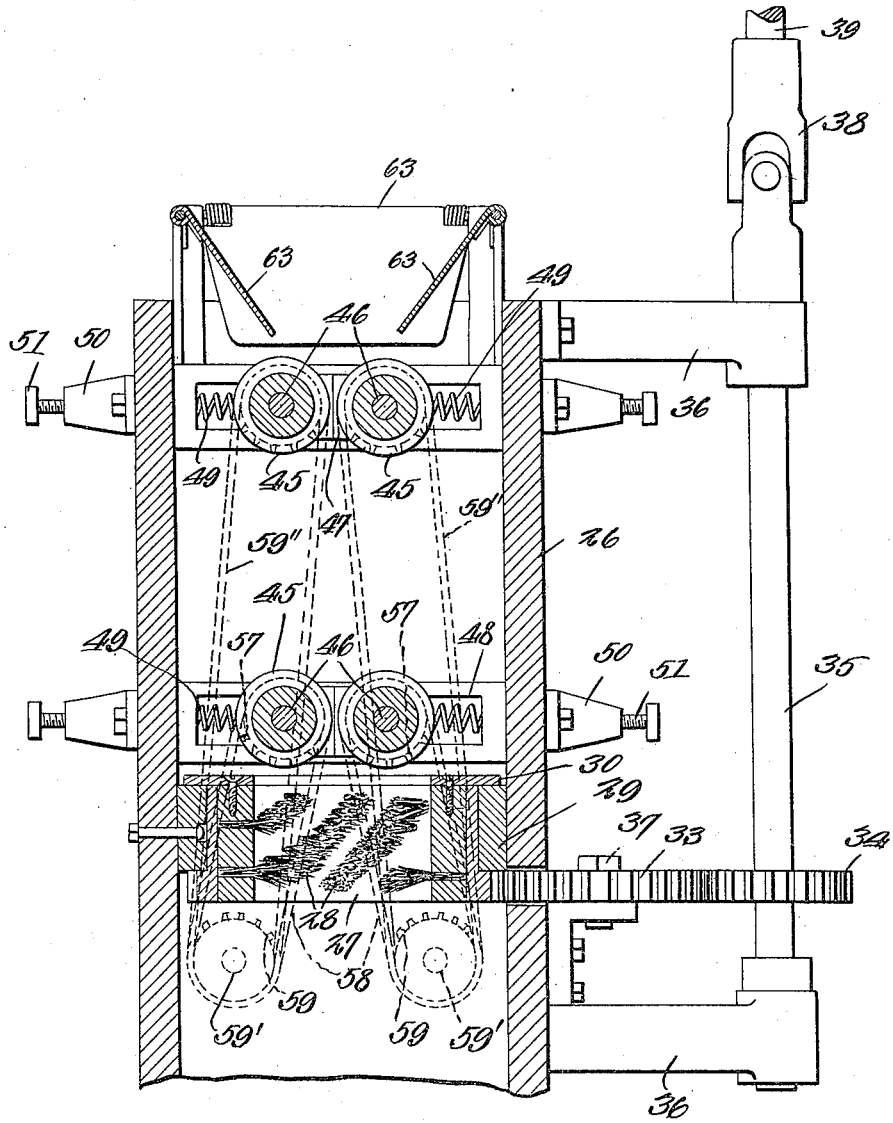

In the drawings—Figure 1 is a plan view of the machine with parts broken away; Fig. 2 is an end view, partly in section; Fig. 3 is an end view of the husking mechanism; Fig. 4 is a vertical cross-section of the husking mechanism; Fig. 5 is an elevation, partly in section, of a modified form of husking mechanism; Fig. 6 is a side elevation of a husk severing device, and Fig. 7 is a front elevation of said device.

Referring specifically to the drawings, 10 denotes a wheeled truck on which the mechanism is mounted, so that it may be conveniently hauled from place to place. Of course, the machine may be built stationary, but it is preferably, made portable.

The truck 10 carries uprights or standards 11 rising to a suitable height and supporting at the top a table or platform 12, and on the latter is mounted another table 13, the same being supported a suitable distance above the table 13 by standards 14. The table 13 is designed to receive the corn stalks, one end of the same being adjacent to the discharge end of an endless conveyer 14'. From the receiving end of the table 13, the same slopes down toward the opposite end where the operator stands, and the stalks therefore roll down to this end of the table, where they are taken up by the operator and presented to a rotary cutter in the form of a circular saw 15 to cut the ears from the stalks. The saw is on a shaft 16 which is belted or otherwise connected, as indicated at 17, to a countershaft 18, the latter, in turn, being belted or otherwise suitably connected, as indicated at 19, to a motor 20 which may be an internal combustion engine mounted on the truck 10. Any other suitable driving means may be provided.

The saw 15 is designed to cut the ears from the stalks at a point where the husks are joined to the cob, so as to leave the husks entirely free and thus facilitate the stripping operation. As the growth of the husks is sometimes such that they are not severed by the saw, there is provided an auxiliary cutter illustrated in detail in Figs. 6 and 7. As here shown, the auxiliary cutter is a flat blade 21 which tapers toward one end and is formed at this end with a centering point 22. This cutter is fixed on the end of the shaft 16 adjacent to the saw 15, and on said shaft is also fixed a guard 23 for the cutter, said guard being a hood which incloses the cutter, the latter being located centrally within the hood, and the hood having a sight opening 24 in its side so that the operation of the cutter may be observed. The hood flares outward and is open at its outer end for the insertion of the ear.

In operation, the ear is inserted into the hood 23 from the open end thereof, with its butt end presented to the auxiliary cutter, and it is pushed forward onto the rotating cutter, the point 22 entering the butt and being followed by the blade 21. As the cutter rotates, a hole is cut in the butt end of the cob, the cut being from the center outward. The ear is manually advanced until enough of the butt end of the cob has been removed to sever the husks and leave the same disconnected from the cob.

Adjacent to the saw 15 and the auxiliary cutter 21 is an inclined chute 25 leading to the husking mechanism which will now be described: In a housing 26 suitably supported in fixed position on the truck 10, is mounted a rotary brush consisting of a hollow cylinder 27 on the inside of which are fixed the bristles 28, the same being arranged spirally. The brush cylinder 27 is supported in a bearing 29 suitably mounted in the housing 26 and has at the top a retaining ring 30 engaging the bearing, whereby the cylinder is prevented from slipping down in the latter.

On the outside of the brush cylinder 27 is a circular rack 31 which is in mesh with a gear 33, the latter in turn being in mesh with a gear 34 on a shaft 35 supported in bearings 36 carried by the housing 26, the latter also carrying a stud 37 in which the gear 33 turns. The shaft 35 is connected by a universal joint 38 to a shaft 39 and the latter is connected by a universal joint 40 to a shaft 41, supported in bearings 42 mounted on the table 12. The shaft 41 is driven from the countershaft 18 through a sprocket-and-chain, or other suitable gearing 43. It will thus be seen that the brush cylinder 27 is driven from the countershaft 18. The shaft 41 has a sliding or other clutch 44 so that the brush cylinder may be thrown into and out of gear at the will of the operator.

A means is provided for feeding the ears through the brush cylinder 27, the same comprising two pairs of grooved feed rollers 45 located in advance of the entrance end of the cylinder. The members of the respective pairs of feed rollers are yieldingly pressed toward each other by mounting the shafts 46 thereof in bearing blocks 47 which are slidably mounted in slotted supports 48 and backed by springs 49. The housing 26 carries the supports 48 and also carries nuts 50, which are provided with screws 51 for adjusting the tension of the springs. The sides of the housing 26 carrying the supports 48 have openings in which the latter are mounted. The feed rollers yield to allow ears of different diameters to pass therebetween, and they are so spaced that the ears are gripped when placed therebetween, whereby they are fed forward.

The following drive gear for the feed rollers 45 is provided: Below the brush cylinder 27, the housing 26, on the outside thereof, carries two shafts 52 provided each with a sprocket wheel 53 and a gear 54. The sprocket wheels 53 are connected by chains 55 to sprocket wheels 56 on one end of the shafts of the upper pair of rollers 45. On the shafts of the lower pair of rollers 45 are sprocket wheels 57 which are connected by chains 58 to sprocket wheels 59 mounted on stub shafts 59' secured to the opposite side of the housing 26 from that on which the shafts 52 are located. Sprocket chains 59'' are trained over sprocket wheels secured to the ends of shafts 46 and over sprocket wheels fixed to and corresponding with the wheels 59 as shown dotted in Fig. 4. The two gears 54 are in mesh with each other, and in mesh with one of said gears is a drive pinion 60 fast on a shaft 61 suitably supported on the outside of the housing 26. The shaft 61 is belted or otherwise operatively connected to the countershaft 18, as indicated at 62. Thus it will be seen that the two sets of feed rollers 45 are driven from the countershaft 18, the motion of the latter being transmitted to the shaft 61 by the belt 62. The motion of the shaft 61 is transmitted by the pinion 60 and the gears 54 to the shafts 52, and the upper set of rollers is driven from the shafts 52 by the chains 55, whereas the lower set is driven from the shafts 46 by the chains 59'', and chains 58.

The chute 25 leads to the upper or entrance end of the housing 26, and here are spring-hinged wings 63 which extend convergingly downward and direct the ears to the upper set of feed rollers 45.

The housing 26 opens at the bottom into a suction box 64 connected by a conduit 65 to the inlet of a rotary fan 66 driven by a belt 67 from the countershaft 18. The suction box has a bottom opening 68 over an inclined chute 69 down which the husked ears slide to a suitable receptacle (not shown). The chute has a perforated portion 70 below which is mounted a hopper 71. Any grains of corn which may drop off the ears pass through the perforations into the hopper, a bag or other suitable receptacle being hung thereon to receive the grains.

The conveyer 14' is driven from the countershaft 18, the latter being geared to a shaft 72 as indicated at 73, and the shaft 72 is connected by a sprocket-and-chain gearing 74 to the top shaft of the conveyer.

In operation, the ears severed from the stalks as already described, are manually thrown into the chute 25 which conveys them to the husking mechanism. The ears drop into the hopper formed by the wings 63 which rights them and presents them endwise to the top feed rollers 45, one after the other. The ear then passes down to the lower feed rollers 45 and is grasped by the latter and pushed down through the brush cylinder 27, where the husks are removed by the action of the bristles 28. The brush cylinder revolves, but the ear does not turn, in view of which the husks are quickly brushed off. If the husks are dry, the brush cylinder may be stopped, and the ears just pushed through the same, which is sufficient to remove the husks. It is only when the husks are still green and cling close to the cob that the rotary motion of the brush is necessary to effect the removal of the husks. When the husks are dry they will be readily stripped off with the brush cylinder stationary, and this also reduces to a minimum the shelling of the corn. The husked ears drop on the chute 69 to be disposed of as already described. The husks drop into the box 64 and are sucked by the fan 66 into the conduit 65 which latter carries the husks to the place of disposal. Preferably, the husks and the stalks will be tied into bundles, a suitable bundling mechanism being provided for this purpose.

Fig. 5 illustrates a modified form of husking brushes, the same comprising two circular brushes 75 mounted face to face in spaced relation so that the ears may pass therebetween. Each brush is mounted on a shaft 76 which is slidably mounted in a hollow shaft 77, the latter carrying a radial pin 78 which seats in a longitudinal slot 79 in the former to provide a driving connection between the two shafts and also to permit the shaft 76 to slide. In the shaft 77 is mounted a spring 80 which abuts at one end against a plug 81 closing the outer end thereof, and at its other end against the end of the shaft 76. Both brushes 75 are mounted in this manner and they are therefore free to yield or spread to permit the passage therebetween of different sized ears. The springs yieldingly hold the brushes pressed against the ears. The brushes are rotatable, they being driven by the drive mechanism of the feed rollers 45. Thus, one of the shafts 77 is connected by a sprocket-and-chain gearing 82 to the shaft of one of the lower feed rollers, whereas the other brush shaft 77 is connected by a sprocket-and-chain gearing 83 to one of the shafts 52. It will be noted that with the brushes 75, the lower feed rollers 45 are operatively connected to the upper feed rollers by a sprocket-and-chain drive 84.

I claim:

1. In a corn husking apparatus, means for severing the husks at their connection with the cob, said means comprising a rotatable tapered blade having a centering point at its apex, and a hood inclosing the blade and arranged to rotate therewith, said hood being open at its outer end.

2. In a corn husking apparatus, means for severing the husks at their connection with the cob, said means comprising a rotatable tapered blade having a centering point at its apex, and a hood inclosing the blade and arranged to rotate therewith, said hood being open at its outer end and having a side opening.

3. In a corn husking apparatus, means for severing the husks at their connection with the cob, said means comprising a rotatable tapered blade having a centering point at its apex, and a hood inclosing the blade, said hood being open at its outer end and flared toward said end.

4. In a corn husking apparatus, means for severing the butt from an unhusked ear of corn, consisting of a shaft with means for rotating the same, a flat cutter on the end of the shaft and tapering at its outer end forming a centering point thereon, and a guard secured to said shaft and surrounding said cutter, said guard flaring outwardly and open at its outer end and also on one of its sides.

In testimony whereof I affix my signature in presence of two witnesses.

SOLOMON GERMAN.

Witnesses:
JOHN F. WARNER,
CHAS. W. HART.

Copies of this patent may be obtained for five cents each, by addressing the "Commissioner of Patents, Washington, D. C."